US008683958B2

(12) United States Patent
Oblack et al.

(10) Patent No.: US 8,683,958 B2
(45) Date of Patent: Apr. 1, 2014

(54) REVERSE WELT BALL

(75) Inventors: Mark J. Oblack, Issaquah, WA (US);
Kyle D. Burger, Seattle, WA (US);
Mark D. Thinnes, Seattle, WA (US)

(73) Assignee: Canine Hardware, Inc., Kent, WA (US)

( * ) Notice: Subject to any disclaimer, the term of this patent is extended or adjusted under 35 U.S.C. 154(b) by 41 days.

(21) Appl. No.: 13/572,366

(22) Filed: Aug. 10, 2012

(65) Prior Publication Data

US 2013/0139797 A1 Jun. 6, 2013

Related U.S. Application Data

(63) Continuation-in-part of application No. 12/029,409, filed on Feb. 11, 2008, now Pat. No. 8,474,410.

(60) Provisional application No. 61/534,755, filed on Sep. 14, 2011.

(51) Int. Cl.
*A01K 29/00* (2006.01)
*A63B 43/00* (2006.01)

(52) U.S. Cl.
USPC .......................................... 119/707; 473/595

(58) Field of Classification Search
USPC .......... 119/707, 709, 702; D30/160; 473/595, 473/597, 598, 600, 607, 423
See application file for complete search history.

(56) References Cited

U.S. PATENT DOCUMENTS

| 1,150,761 | A | * | 8/1915 | Hartman | ........................ 273/112 |
| 4,253,672 | A | | 3/1981 | Milzoff | |
| 4,503,635 | A | | 3/1985 | Harrington | |
| 5,035,425 | A | | 7/1991 | Edwards | |
| 5,048,829 | A | * | 9/1991 | Prokupek | ........................ 473/595 |
| 5,484,159 | A | | 1/1996 | Dean | |
| 5,540,610 | A | | 7/1996 | Sneddon | |
| 5,588,648 | A | * | 12/1996 | Stebbins | ........................ 473/451 |
| 5,904,118 | A | | 5/1999 | Markham | |
| 6,099,423 | A | * | 8/2000 | Ou | ........................ 473/604 |
| 6,174,214 | B1 | | 1/2001 | Cooper | |
| 6,247,989 | B1 | | 6/2001 | Neff | |
| D456,959 | S | * | 5/2002 | Simon | ........................ D30/160 |
| 6,415,740 | B1 | | 7/2002 | Curry | |
| 6,615,766 | B1 | | 9/2003 | Curry | |
| 6,918,355 | B1 | | 7/2005 | Arvanites | |
| D516,145 | S | | 2/2006 | Oblack | |
| 7,096,826 | B2 | | 8/2006 | Markham | |
| 7,250,014 | B2 | * | 7/2007 | Trowers | ........................ 473/595 |
| D577,396 | S | | 9/2008 | Burger | |
| D580,112 | S | * | 11/2008 | Stiles | ........................ D30/160 |
| D609,290 | S | | 2/2010 | Oblack | |
| D609,761 | S | | 2/2010 | Burger | |
| D613,913 | S | * | 4/2010 | Watson et al. | ........................ D30/160 |

(Continued)

*Primary Examiner* — Yvonne Abbott
(74) *Attorney, Agent, or Firm* — Eckert Seamans Cherin & Mellott, LLC; Brij K. Agarwal

(57) ABSTRACT

A ball (100) having a foam core (110) with a channel recess (114) formed on its surface is enclosed by a cover assembly including a rubber channel assembly (120) in the shape of a spherical curve, such as a baseball curve, and fabric panels (132) that are fixed to the channel assembly. The channel assembly is configured to be inserted into the channel recess in the core. In an embodiment, a heat-activated adhesive substrate is disposed between the cover assembly and the core. In an embodiment, a launcher engages the channel assembly to aid in throwing the ball. In an embodiment, a removable insert (220) is insertable to be retained in the channel assembly.

24 Claims, 9 Drawing Sheets

(56) References Cited

U.S. PATENT DOCUMENTS

| | | |
|---|---|---|
| 7,762,214 B2 | 7/2010 | Ritchey |
| D624,251 S * | 9/2010 | Rutherford ................. D30/160 |
| 7,895,995 B2 | 3/2011 | Simon |
| 7,976,417 B2 * | 7/2011 | Bagley et al. ................. 473/571 |
| D673,740 S * | 1/2013 | Burger et al. ................ D30/160 |
| D680,698 S * | 4/2013 | McWilliams ................. D30/160 |
| 2003/0008727 A1 * | 1/2003 | Miller ........................... 473/351 |
| 2003/0157862 A1 | 8/2003 | Dunn |
| 2004/0089245 A1 | 5/2004 | Markham |
| 2006/0068952 A1 * | 3/2006 | Davignon .................... 473/613 |
| 2006/0102098 A1 | 5/2006 | Zelinger |
| 2006/0201446 A1 | 9/2006 | Edwards |

* cited by examiner

REVERSE WELT BALL

CROSS-REFERENCES TO RELATED APPLICATIONS

This application claims the benefit of U.S. Provisional Application No. 61/534,755, filed Sep. 14, 2011, and is a continuation-in-part of application Ser. No. 12/029,409, filed Feb. 11, 2008, the entire disclosures of which are incorporated by reference herein.

BACKGROUND

Recreational balls for competitive and fitness activities, for general play activities, and for pet play and training activities are known in the art, and provide endless hours of recreation for users. Typically such balls are designed to produce a predictable and consistent behavior. Some novel balls have been designed to produce less predictable behavior, for example, balls having multiple planar sides, off-center weighting, or the like. Often, balls are suitable for either outdoor use, for example, being of relatively heavy and/or dense construction and/or of harder materials. Other balls are suitable primarily for indoor use, for example, being of very light construction and/or lacking the ruggedness for outdoor play.

It is often desirable to provide a ball that is suitable for both indoor play and for outdoor play. For example, a ball suitable for indoor play is typically relatively soft, lightweight, and compliant. A ball suitable for outdoor play will typically have enough mass to withstand at least light breezes, and have a relatively rugged outer surface.

For some gaming activities, it is desirable to provide a ball that exhibits erratic or unpredictable behaviors. For example, it may be desirable to introduce chance into a game, or to develop and test a user's reflexes and reaction times. Similarly, it may be desirable to introduce erratic behavior when playing and/or training pets, both to keep the pet's attention and enjoyment of the game, and to keep the pet's reflexes sharp.

Typically prior art balls are designed either to be tossed or kicked. For balls intended for play with a pet, the ball may be designed to allow the pet to carry the ball in its mouth, usually by providing a sufficiently small diameter. To provide for a large variety of play modes, it would be beneficial to design a ball that can be kicked and that allows the user and/or pets to grasp the ball, preferably with a variety of grasping features. In prior art balls, to be graspable they are typically either designed with a diameter smaller than a typical span of a hand, or are provided with extensions such as handles, ropes, or posts that the user can grasp. Such extensions, however, may undesirably interfere with the ability of the ball to roll. It would be an advantage to provide a generally spherical ball that is larger than a user's hand span, but can still be grasped for throwing and the like.

For pet play and/or training, it is also desirable to provide a ball having a size, mass, softness, and rolling performance that appeal to the interests and instincts of herding animals so as to maximize the exercise and training value of the ball when used with herding animals. For example, a ball having a maximum transverse dimension (or diameter, for a sphere) of under eight inches is desirable. This size would generally allow two balls per 12" merchandising peg as well as optimal pack-out on 40"×48" pallets. Also a ball having a durable exterior and a compliant interior results in a more animal-like feel (in terms of biteability) than other configurations and constructions. For training, it would be beneficial to provide a ball that allows for the application of consumable animal training aids (e.g., peanut butter, scent materials).

For all applications, it is often desirable to provide a ball that is significantly larger than a standard tennis or fetch ball, and that is suitable for kicking, catching, lofting and dribbling.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A ball includes a foam core optionally having a center void. At least one wide and elongate channel (that may be shaped, for example, as a spherical curve such as a baseball curve) is defined on a surface of the foam core. A channel-shaped rubber insert assembly is sized to fit into the elongate channel. A fabric cover is attached to the insert and overlies portions of the foam core that are not covered by the channel-shaped insert, such that the fabric cover and channel-shaped insert cooperatively enclose the foam core. For example, the fabric cover may comprise a plurality of woven panels. The ball may be substantially spherical or generally in the shape of a prolate spheroid, in some embodiments.

In an embodiment the channel-shaped insert includes outward facing flanges, and the fabric cover is stitched to the flanges. The channel-shaped insert and the fabric cover may also be adhesively attached to the foam core.

In an embodiment, a heat-activated adhesive substrate is disposed between the foam core and the channel-shaped insert and the fabric cover, and securely adheres the components together.

In an embodiment, the channel-shaped insert has a textured gripping surface and a variable width. For example, the channel width may have a maximum width between 8% and 12% of a circumference of the ball, and a minimum width between 4% and 8% of the circumference.

In an embodiment, the channel-shaped insert and the cover are brightly and complementarily colored; for example, in one embodiment the insert is blue and the cover is orange/red, which aids in visually tracking the ball.

In particular embodiments, the ball further includes a launcher with a lanyard that is configured to engage the channel-shaped insert to facilitate throwing the ball. The launcher may include an elongate flexible member designed specifically for use with the ball, or may be an attachment designed to fasten to an existing flexible elongate member.

In a particular embodiment, the ball includes one or more separable inserts that are configured to removably engage the channel-shaped insert such that the separable insert is retained on the ball during play, wherein the separable insert modifies the rolling characteristics of the ball. The separable insert may include protrusions, fins, or the like.

A method for forming a ball having an elongate channel includes (i) forming a substantially spherical or prolate spheroidal foam core having an elongate channel recess on an outer surface; (ii) forming a cover assembly that is sized to receive the core, the cover assembly having an elongate rubber channel that is fixedly attached to a plurality of fabric panels; (iii) inserting the core into the cover assembly such that the rubber channel is disposed in the core channel recess; and (iv) closing the cover assembly such that the core is fully enclosed by the cover assembly.

In an embodiment the method further includes applying an adhesive to the core or forming a heat-activated adhesive substrate to overlie the core between the core and the cover assembly, positioning substrate between the core and the cover assembly, and heating the substrate to activate the adhesive.

In an embodiment the elongate channel recess is in the shape of a spherical curve. In an embodiment the rubber channel has a varying width.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
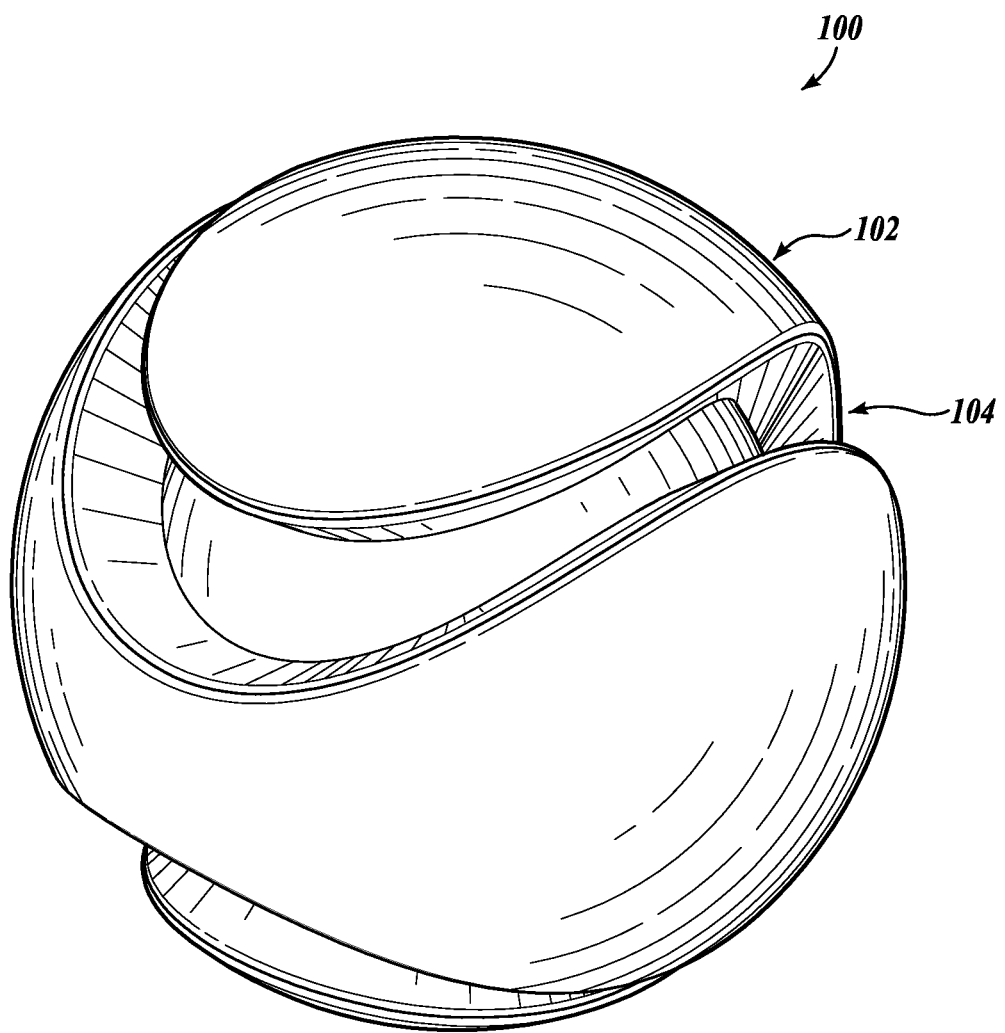
FIG. 1A is a perspective view of a toy ball in accordance with the present invention.
Figure 1B:
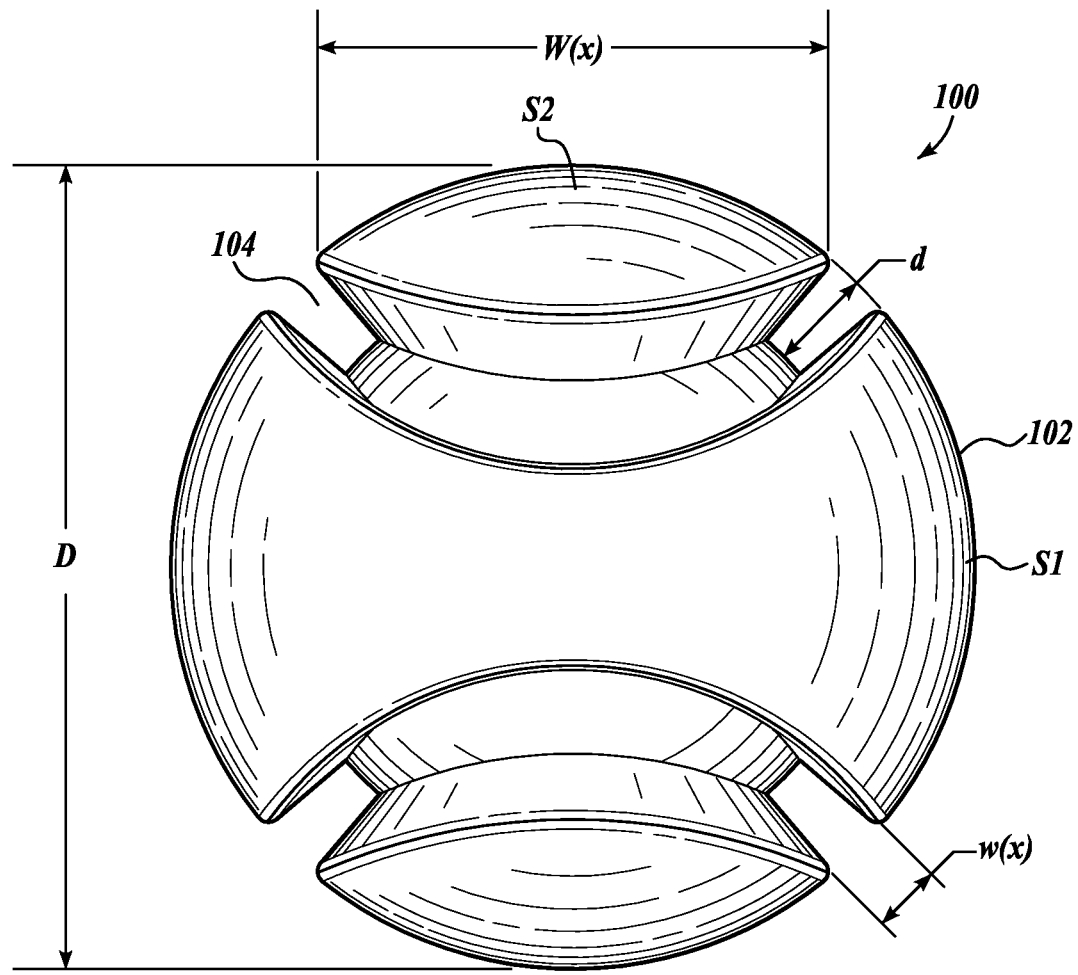
FIG. 1B is a front view of the ball shown in FIG. 1A.
Figure 1C:
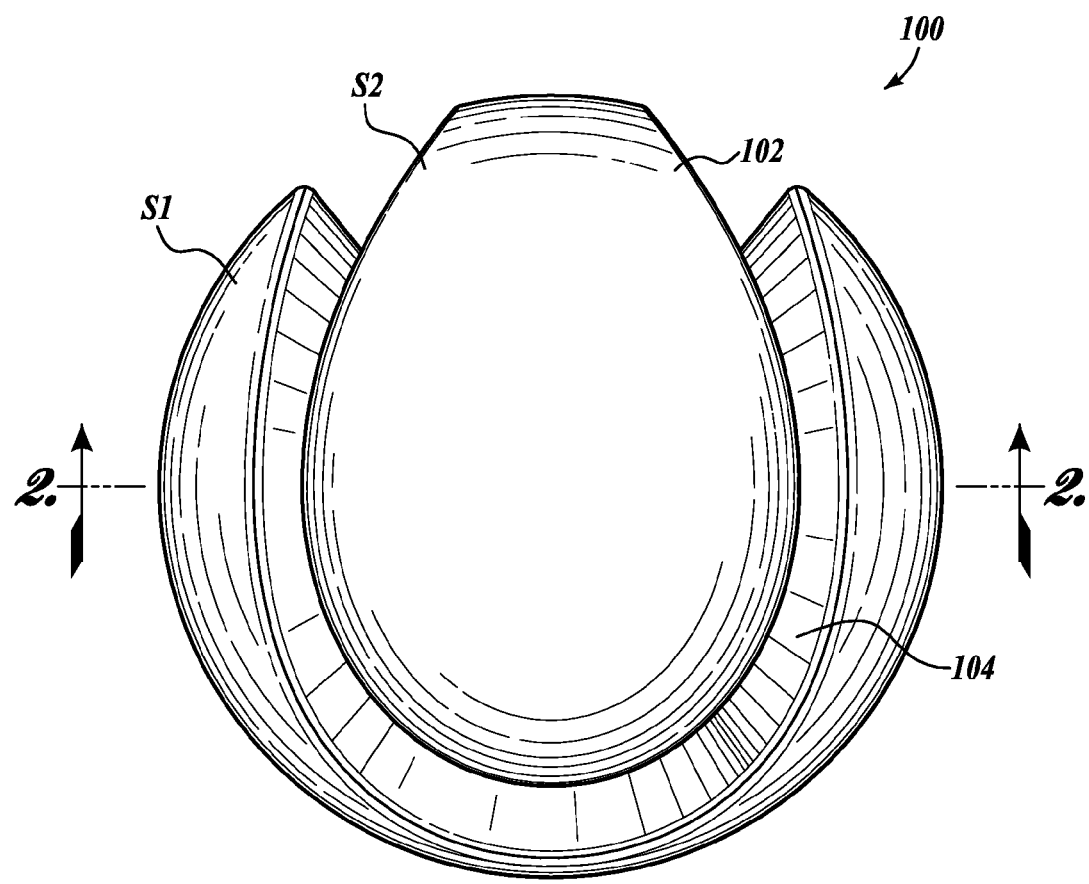
FIG. 1C is a top view of the ball shown in FIG. 1A.

A novel reverse welt ball 100 having a deep channel 104 that partitions the outer surface 102 into plural portions, in accordance with the present invention, will now be described with reference to the FIGURES wherein like numbers indicate like parts. FIG. 1A is a perspective view of the reverse welt ball 100, which is suitable for athletic play, and is also well-suited as a pet toy. A front view of the ball 100 is shown in FIG. 1B and a top view of the ball 100 is shown in FIG. 1C.

The ball 100 in this embodiment defines a generally spherical outer surface 102 and a relatively wide and deep channel or reverse welt 104 defining a spherical-curve-shaped channel in the ball 100. The terms "channel" and "reverse welt" are used interchangeably herein to refer to an elongate recess defined on the surface of the ball 100. Examples of suitable spherical curves include Seiffert's spherical spiral, a spherical helix, a spherical spiral, etc. The reverse welt 104 in the current embodiment defines a single closed spherical curve sometimes referred to as a "baseball curve" due to its similarity to the shape of a baseball seam.

Although the baseball curve-shaped channel 104 of the disclosed embodiment is currently preferred, and produces an aesthetically-pleasing ball 100 with desirable functional aspects as discussed below, other channel curve shapes are contemplated, including, for example, one or more parallel or intersecting longitudinal and/or latitudinal channels. Alternatively, channels segmenting the surface into particular shapes, for example, triangular, circular, or square segments, may be distributed over the surface of the ball, and may partition the outer surface 102 into more than two segments.

In currently preferred embodiments the outside diameter D of the ball 100 (see, FIG. 1B) is between four inches and twenty-four inches, and more preferably between five inches and twelve inches. In a current embodiment, the ball 100 has an outside diameter D of about 5.6 inches, and in another current embodiment the ball 100 has an outside diameter D of about 7.6 inches.

The channel 104 has a depth "d" and a width "w(x)," that are selected to allow a user to grasp the ball 100 by inserting his/her finger tips into the channel 104 and grasping opposing portions of the sidewall of the channel 104. The channel 104 depth d and width w(x) may similarly be deep enough and wide enough to allow a pet to carry the ball using a biting grasp that engages the channel 104, at least on one side.

In currently preferred embodiments, the channel 104 has a depth d of between 0.3 inches and 1.8 inches, and more preferably between 0.4 inches and 1.2 inches. In a particular embodiment, the channel 104 is about 1.0 inches deep. The depth d of the channel 104 may be scaled with the outside diameter D of the ball 100. For example, the channel 104 may be configured to have a depth d of between 7% and 20% of the ball 100 outside diameter D. Although in the current embodiment the channel depth is relatively constant, it is contemplated that the depth may vary.

In a current embodiment, the width w(x) of the channel 104 varies along its length. In addition to aesthetic considerations, the variable width w(x) of the channel 104 provides the user and/or pet with options for grasping the ball 100, increasing the play value.

For example, the width w(x) of the channel 104 at the surface of the ball 100 may vary from a minimum width between 0.2 inches on smaller balls and 1.2 inches on larger balls to a maximum width between 1.0 inches on smaller balls and 3.0 inches on larger balls. The minimum and maximum widths of the varying-width channel 104 may also be scaled with the circumference of the ball 100. For example, the channel 104 may be configured to have a width w(x) at the ball outer surface 102 that varies between a minimum width between 4% and 8% of the ball circumference, and a maximum width between 8% and 12% of the ball circumference.

The width w(x) of the channel 104 will typically also vary radially, for example, the width of the channel 104 at the outer surface 102 of the ball 100 will typically be different from the width of the channel 104 at the floor of the channel 104. The channel 104 sidewalls may converge radially outwardly such that the channel 104 is narrower at its opening than at its floor ("negative draft") which may make it easier to grasp. Conversely, the channel sidewalls may diverge, to produce a positive draft. It is also noted that although the channel 104 is illustrated with flat sidewalls, in a current embodiment the sidewalls are bowed or curved, having a negative draft near the channel floor, and flaring outwardly near the outer surface 102 of the ball 100.

As shown in FIGS. 1A, 1B, and 1C, the channel 104 partitions the outer surface 102 into two segments or panels S1, S2 having varying widths W(x). The varying width segments S1, S2 allow the user (or pet) to selectively grasp the ball 100 with different grips by grasping the ball 100 in different locations.

The channel 104 defined on the surface 102 of the ball 100 provides advantages for enhancing play with the ball 100 that are not found in prior art balls. For example, as discussed above, the deep channel 104 provides unique grasping functionality for either a human hand or for a pet's teeth. In particular, the variable width and curved configuration of the channel 104 results in a continuously variable bite/grip zone. This makes the ball 100 easy to grip in different orientations, and to easily accommodate different hand sizes and different jaw sizes.

Also, the channel 104 will produce unique rolling characteristics for the ball 100. At higher rolling speeds, the ball 100 will roll in a manner approximating the rolling characteristics of a spherical ball. However, the rolling tends to become more erratic and less predictable as the rolling speed decreases. The unique predictable/unpredictable rolling characteristics provides a user with fast reaction training for sports such as soccer, and provides animal mimicking behavior for training and exercising pets, for example, herding dogs. The erratic behavior also provides new gaming modes, for example, games involving rolling or throwing the ball 100 towards a desired target, and scoring on the basis of nearness to the target when the ball 100 stops. As discussed below, the erratic rolling behavior may be augmented or emphasized with an optional insert 220 (see, FIG. 5).

For pet or work animal training, the reverse welt channel 104 also provides a convenient floor or bottom surface that can be coated with useful training aids (e.g., peanut butter, scent materials, etc.). The large and deep channel 104 is also easy to clean.

The channel 104 in some embodiments is configured to produce an audible signal, for example, a whistle or white noise during flight, generated by air flow through the channel 104. The signal will provide auditory cues for users and/or pets during play when the ball 100 is in flight. The auditory cues may assist the user or pet in tracking the ball 100.

The channel 104 provides new modes of play with optional accessories. For example, the large channel 104 provides a convenient engagement for a launching device 200 (see, FIG. 4), for enhanced play and to permit the ball 100 to be thrown longer distances, for example, for playing fetch and the like. In another example, the ball 100 may be provided with accessories (e.g., insert 220) that removably attach to the ball 100 by insertion into the channel 104.

Figure 2:
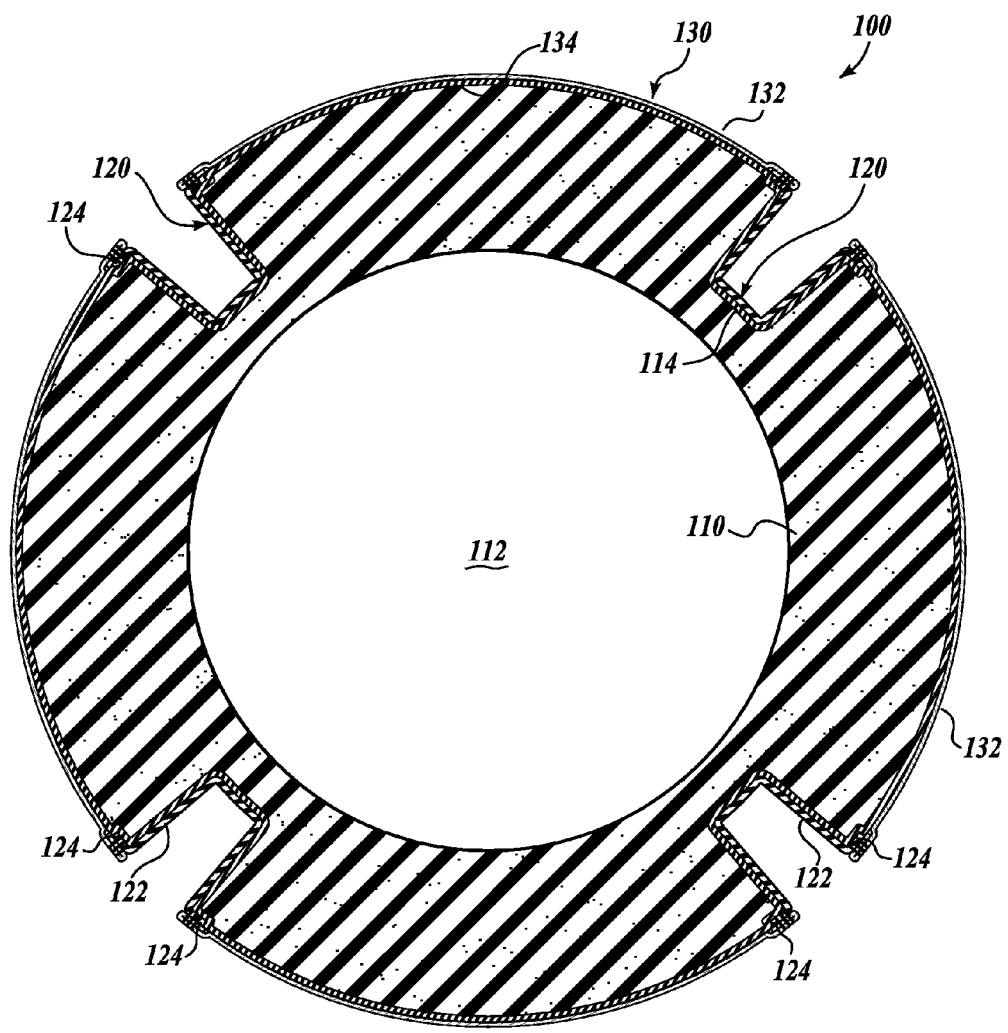
FIG. 2 is a cross-sectional view of the ball shown in FIG. 1A.
Figure 3:
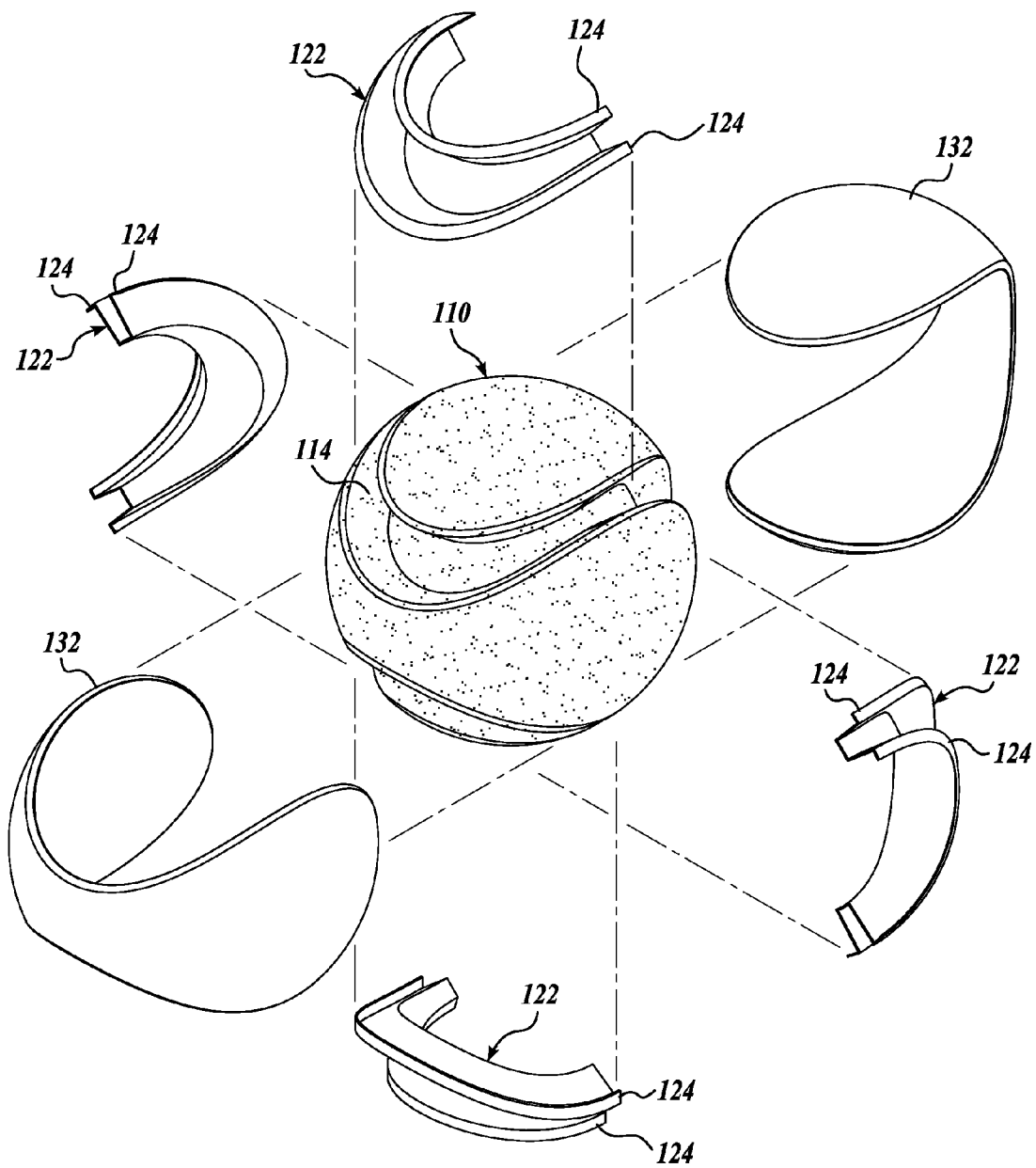
FIG. 3 is an exploded view of the ball shown in FIG. 1A.

A currently preferred construction is shown in cross-sectional view in FIG. 2 and in exploded view in FIG. 3. The ball 100 includes a foam core 110, an elongate channel assembly 120 that is attached to and retained on the foam core 110, and a fabric cover 130 fixed to an outer surface of the foam core 110.

The foam core 110 comprises a compressible and pliable elastomeric foam that in this embodiment is generally spherical and has a channel recess 114. The foam core 110 may optionally define a center void or air pocket 112, to reduce the weight of the ball 100 and/or to improve the bouncing characteristics of the ball 100. An elastomeric foam having a density in the range of 1.4 pounds per cubic foot (pcf) to 6.0 pcf is suitable for the foam core 110. In currently preferred embodiments, the foam core 110 has a density of between 1.8 and 4.2 pcf, and more preferably about 2.0 pcf.

The channel assembly 120 in this embodiment is a molded synthetic or natural rubber or a rubber blend, and is sized and shaped to be inserted into the channel recess 114 formed in the foam core 110. In a current embodiment, for convenience the channel assembly 120 is formed from four U-shaped channel members 122 that are stitched together end-to-end to form the channel assembly 120. The channel members 122 further define an outward flange 124 on each side, for attaching the channel assembly 120 to the foam core 110 and to the fabric cover 130.

The fabric cover 130 in this embodiment comprises two fabric panels 132 that are sized and shaped to cover the outer portions of the foam core 110 demarcated by the channel recess 114. Optionally, an adhesive or a double-sticky substrate 134 (not shown in FIG. 3, for clarity), sometimes referred to as a "sew free film," is disposed on the outer surface of the foam core 110, between the channel assembly 120 and the foam core 110, and also between the fabric panels 132 and the foam core 110, to fix the fabric cover 130 and the channel assembly 120 to the foam core 110. In a current embodiment, the substrate 134 is heat activated. The substrate 134 also provides additional protection for the foam core 110, to prevent the ingress of liquids and the like.

The fabric cover 130 and the channel assembly 120 are stitched together along the entire length of the channel member flanges 124. In a particular method of construction, one of the fabric panels 132 is split or formed in two portions, and the channel assembly 120 and cover 130 are assembled (e.g., by sewing) in an inverted configuration. The assembled cover 130 and channel assembly 120 is then wrapped around the foam core 110 with the heat-activated substrate 134 disposed therebetween, and the split fabric panel 132 is sewn together to fully enclose the foam core 110. The assembled ball 100 is then heated to activate the adhesive substrate 134, producing a very securely assembled ball 100 that is able to withstand long hours of rigorous play.

The foam core 110 in this embodiment is completely covered and protected cooperatively by the fabric cover 130 and the channel assembly 120. Moreover, the fabric cover 130 defines the outermost portion of the ball 110, and will therefore encounter substantially all of the direct contact with the environment during play. Therefore, the fabric component 130 is formed from a tough and abrasion-resistant fabric, and is well configured to protect the other ball components. The channel assembly 120 is formed from a rubber, thereby providing superior gripping properties. In a current embodiment, the exposed walls of the channel assembly 120 are textured, to further enhance the gripping properties of the ball 100.

Preferably, for some applications the fabric cover 130 is a first bright color, for example, an orange or a red, and the channel assembly 120 is a second darker color, for example, a blue or green, that provides contrast from the first color. In a particular example, the first and second colors are complementary colors, for example, red/green, blue/orange, yellow/violet, etc. The large size and contrasting color panels of the reverse welt ball 100 make the ball 100 easy to see and track when rolling on the ground, flying through the air, or sitting at rest. While rolling, the alternating flashes of complementary colors and hard transition edges between adjacent color panels 132 and reverse welt 120 areas are visually stimulating versus single-color balls.

Figure 4:
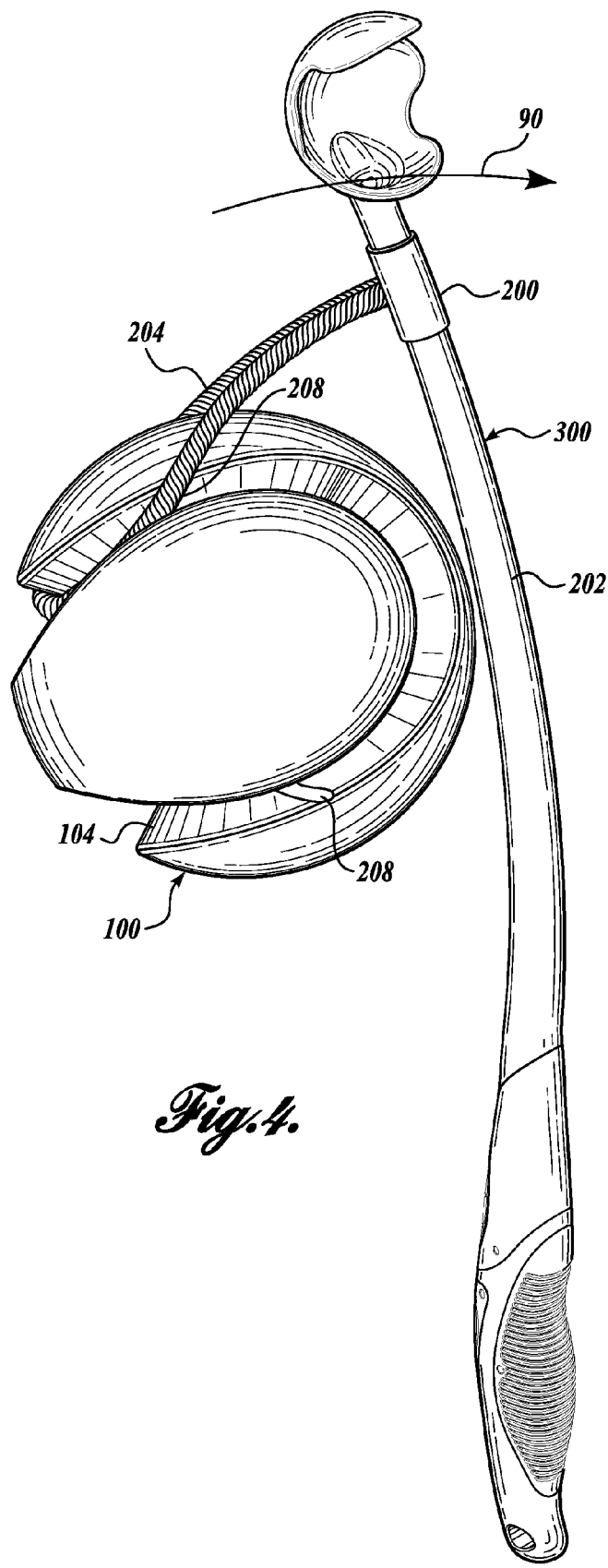
FIG. 4 shows a launcher suitable for use to launch the ball shown in FIG. 1A.

FIG. 4 illustrates the ball 100 with a throwing aid or launcher 200. The launcher 200 includes a handle portion 202, which may optionally comprise a known ball launcher used for tossing smaller balls, for example, the launcher disclosed in U.S. Pat. No. 6,076,829, which is hereby incorporated by reference in its entirety. In a current embodiment the elongate handle portion 202 is elastically flexible. A strap, lanyard, cord or the like is configured in a loop 204 and attached or fixed to the handle portion 202 at or near an upper end of the handle portion 202. For example, the loop 204 may be fixed to a collar 206 having a gripping or non-slip inner surface, and that wraps around the handle portion 202. The sleeve may be tightly engaged by any conventional means, for example, with an elastic band or with a hook and loop fastener. Alternatively, the loop 204 may be permanently fixed to the handle portion 220.

The loop 204 is formed from a material sized to releasably engage the channel 104 in the ball 100. The ball 100 is positioned generally as shown in FIG. 4, adjacent the upright handle portion 202, with the loop 204 supporting the ball 100. The user swings the handle portion 202 in a forward arc as indicated by arrow 90, such that the ball 100 swings around the top of the launcher 200 and is released by the loop 204.

Optionally, the channel 104 may include a transverse slot or recess 208 as a guide for the loop 204 for consistent positioning of the ball 100.

Figure 5:
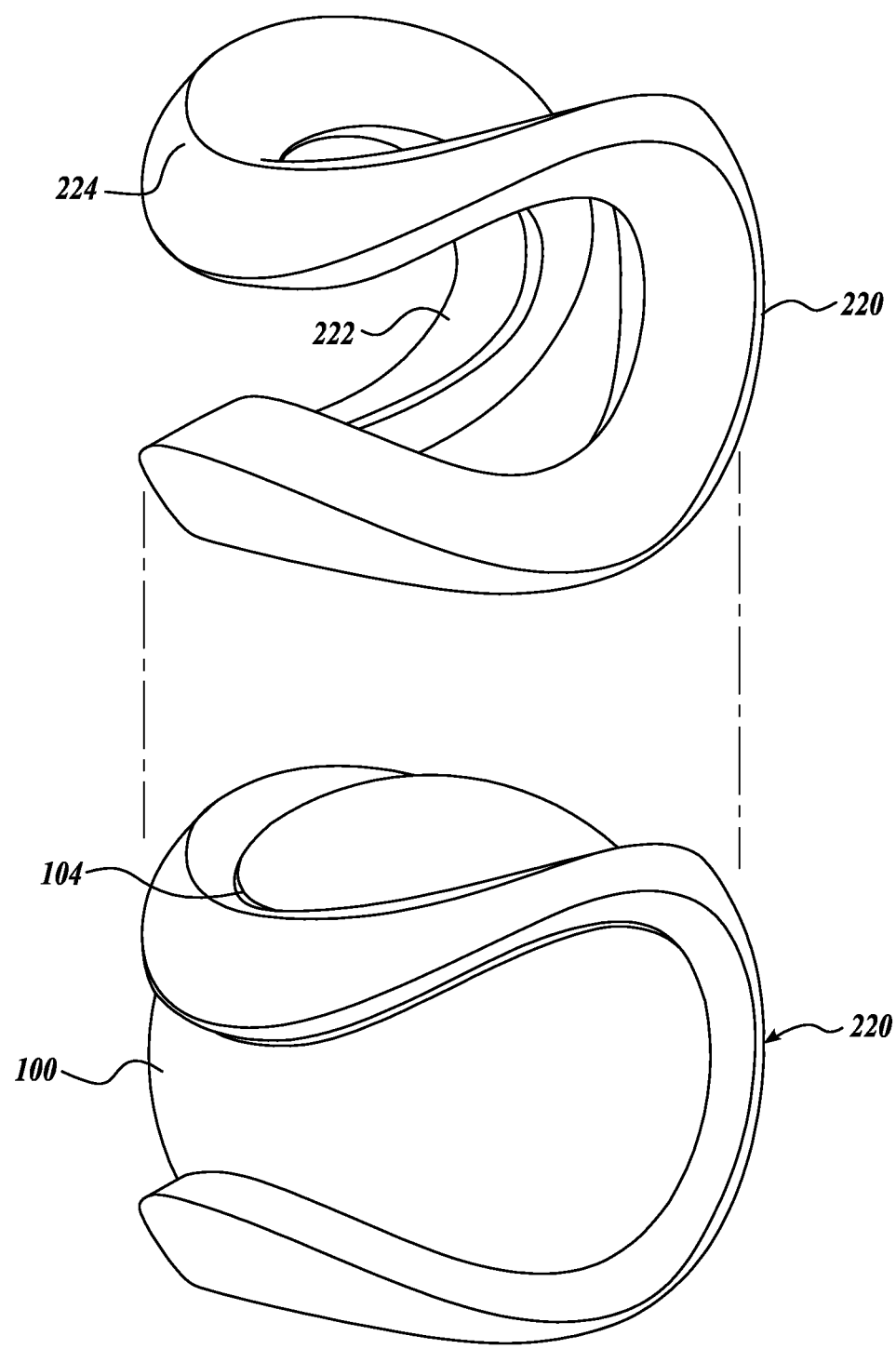
FIG. 5 shows an insert configured to be retained in the reverse well of the ball shown in FIG. 1A.

FIG. 5 illustrates the ball 100 with an optional insert 220. The insert 220 is configured and shaped to be retained in the channel 104 of the ball 100. In particular, the insert has an inner portion 222 that is shaped to approximately match the channel 104 on the ball 100, and an outer portion 224, at least some of which extends outwardly from the ball 100, when assembled. The ball 100, which is flexible and compressible, may be manipulated to receive the insert 220.

The insert 220, when attached to the ball 100, significantly alters the rolling characteristics of the ball 100, and in particular can produce an erratic and unpredictable rolling path for the ball 100. Such erratic rolling may be particularly entertaining for play with pets. The insert 220 may also protect the ball 100. For example, the insert 220 may be formed from a relatively stiff material, wherein the ball 100 is deformed to receive and engage the insert 220. Then the insert 220 may protect the fabric cover 130, for example, for play on a hard surface such as concrete. Alternatively, the insert 220 may be formed from a very soft material for indoor play.

Although the illustrated insert 220 has a relatively constant thickness, it is contemplated that the ball 100 may be provided with any number of inserts having different characteristics and shapes, to provide a variety of different gaming and play variations. For example, inserts may be formed with radially extending fins at select locations, with gaps or protrusions, and the like.

Figure 6A:
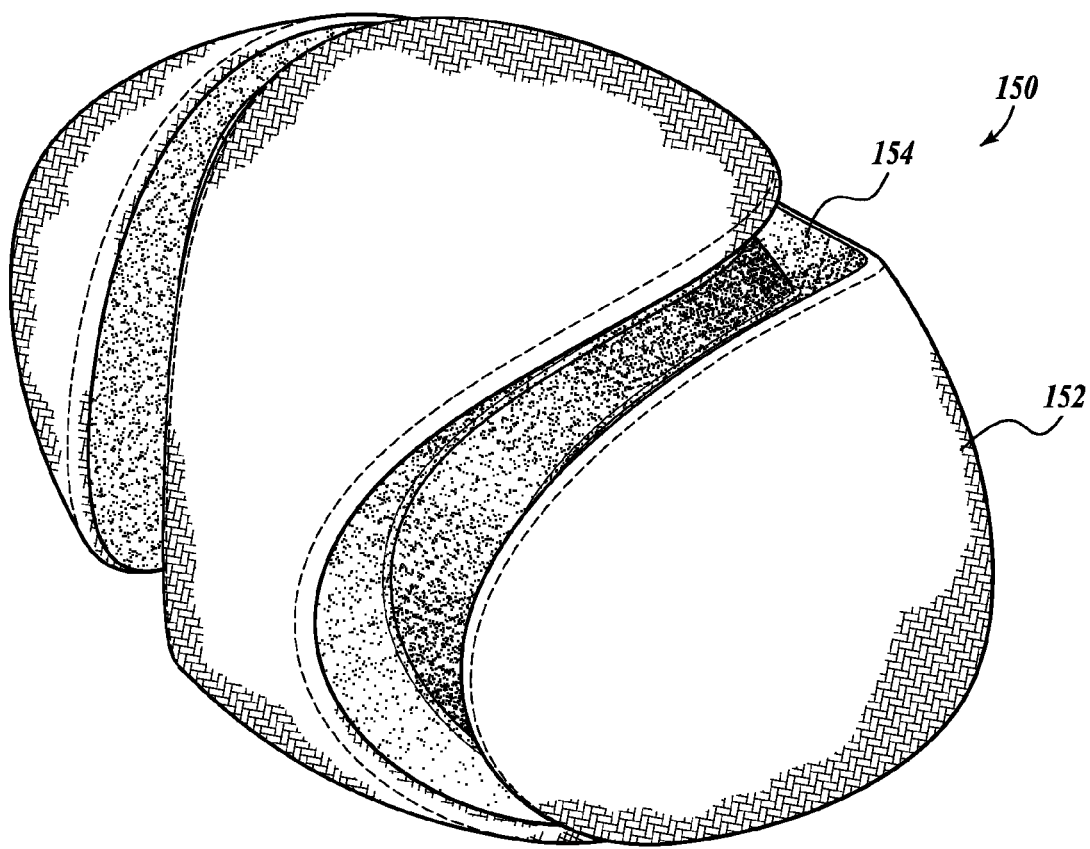
FIG. 6A is a perspective view of a second embodiment of a ball in accordance with the present invention, wherein the ball is generally in the shape of a prolate spheroid.
Figure 6B:
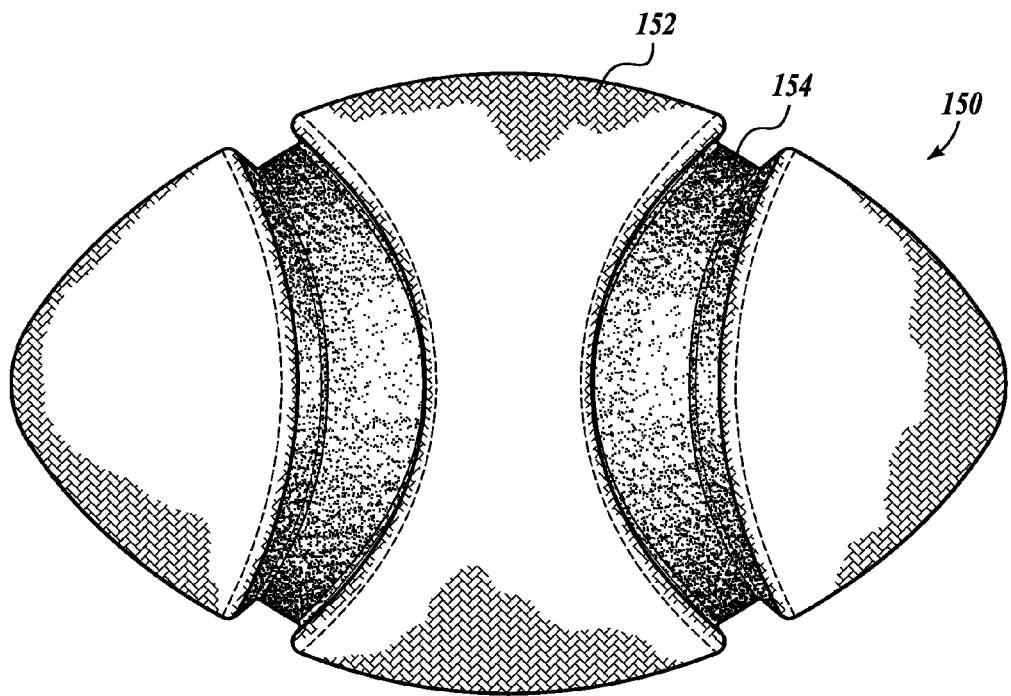
FIG. 6B is a front view of the ball shown in FIG. 6A.
Figure 6C:
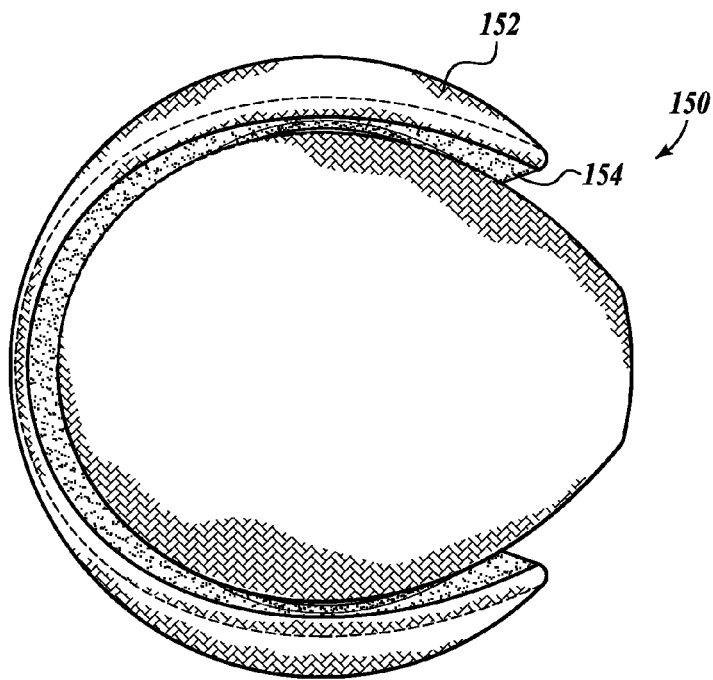
FIG. 6C is a side view of the ball shown in FIG. 6A.

A perspective view of a second embodiment of a ball 150 in accordance with the present invention is shown in FIG. 6A. In this embodiment the ball 150 is generally in the shape of a prolate spheroid, or generally football-shaped. The ball 150 has an outer surface 152 that is preferably formed from a tough and durable fabric, and a wide and deep channel 154 in the shape of a closed curve and that is preferably formed from a natural or synthetic rubber. A front view of the ball 150 is shown in FIG. 6B and a side view is shown in FIG. 6C.

The ball 150 is preferably constructed in a manner similar to the first embodiment shown in FIGS. 1A-1C and discussed above. In particular, a foam core (not shown) having an elongate channel is sized and shaped to receive a rubber channel assembly defining the channel 154, which is fixed to cover panels forming the outer surface 152. Preferably, a heat-activated adhesive substrate is provided between the foam core and the panels forming the outer surface 152. In a current embodiment the surfaces of the channel 154 are textured to facilitate and improve the user's grip.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ball comprising:
    a foam core defining a deep and wide elongate channel along a surface of the foam core;
    a channel-shaped insert received into the elongate channel and completely overlying the elongate channel, wherein the channel-shaped insert comprises a rubber; and
    a fabric cover attached to the channel-shaped insert, and overlying portions of the foam core that are not covered by the channel-shaped insert such that the foam core is enclosed cooperatively by the channel-shaped insert and the fabric cover.

2. The ball of claim 1, wherein the channel-shaped insert defines a spherical curve.

3. The ball of claim 1, wherein the fabric cover comprises a plurality of woven panels.

4. The ball of claim 1, wherein the channel-shaped insert further comprises flanges, and the fabric cover is attached to the channel-shaped insert by stitching to the flanges.

5. The ball of claim 1, wherein the fabric cover is attached to the foam core with an adhesive.

6. The ball of claim 5, wherein the adhesive comprises a heat-activated adhesive substrate.

7. The ball of claim 1, wherein the channel-shaped insert defines a channel having a varying width.

8. The ball of claim 7, wherein the channel has a maximum width that is between 8% and 12% of a circumference of the ball and a minimum width that is between 4% and 8% of the circumference.

9. The ball of claim 1, wherein the channel-shaped insert has a textured surface that improves the gripping properties of the insert.

10. The ball of claim 1, wherein the foam core defines a center void.

11. The ball of claim 1, wherein the foam core has a density in the range of 1.4 pounds per cubic foot and 6.0 pounds per cubic foot.

12. The ball of claim 1, wherein the cover is a first color and the channel-shaped insert is a second color that is complementary to the first color.

13. The ball of claim 1, wherein the ball is generally in the shape of a prolate spheroid.

14. A ball and launcher comprising the ball of claim 1, and further comprising a launcher comprising a flexible handle portion and an elongate pliable member fixed to the handle portion and configured to releasably engage the channel-shaped insert.

15. The ball and launcher of claim 14, wherein the elongate pliable member comprises a strap, a lanyard, or a cord.

16. A ball and launcher attachment comprising the ball of claim 1, and further comprising a launcher attachment configured to be fixed to a flexible elongate member, the launcher attachment comprising a collar portion having a releasable attachment, and an elongate pliable member fixed to the collar portion and configured to releasably engage the channel-shaped insert.

17. The ball and launcher attachment of claim 16, wherein the elongate pliable member comprises a strap, a lanyard, or a cord.

18. A ball and separable insert comprising the ball of claim 1, and further comprising a separable insert that is sized and configured to be releasably retained in the channel-shaped insert, wherein the separable insert modifies the rolling characteristics of the ball.

19. A method for forming a ball having an elongate channel comprising:
    (a) forming a substantially spherical or prolate spheroidal core defining an elongate channel recess on its outer surface;
    (b) forming a cover assembly sized and configured to receive the core, the cover assembly comprising a rubber channel that is fixedly attached to a plurality of panels;
    (c) inserting the core into the cover assembly such that the rubber channel is disposed in the core channel recess; and
    (d) closing the cover assembly such that the core is fully enclosed by the cover assembly.

20. The method of claim 19, further comprising applying an adhesive to the core prior to inserting the core into the cover assembly.

21. The method of claim 19, further comprising:
(e) forming a heat-activated adhesive substrate to overlie the core between the core and the cover assembly,
(f) positioning the adhesive substrate between the core and the cover assembly, and
(g) heating the adhesive substrate to activate the adhesive.

22. The method of claim 19, wherein the plurality of panels comprise fabric panels, and the cover assembly is assembled by stitching the fabric panels to the rubber channel.

23. The method of claim 19, wherein the elongate channel recess is in the shape of a spherical curve.

24. The method of claim 19, wherein the channel has a width that varies along the length of the channel.

\* \* \* \* \*